(12) United States Patent
Chen et al.

(10) Patent No.: US 12,694,057 B2
(45) Date of Patent: Jul. 28, 2026

(54) VIDEO COLLECTION PRESENTATION METHOD AND APPARATUS, ELECTRONIC DEVICE, AND READABLE STORAGE MEDIUM

(71) Applicant: Beijing Zitiao Network Technology Co., Ltd., Beijing (CN)

(72) Inventors: Shiting Chen, Beijing (CN); Jiaxin Wang, Beijing (CN); Yijing Lin, Beijing (CN); Min Shen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 148 days.

(21) Appl. No.: 18/573,234

(22) PCT Filed: Dec. 20, 2022

(86) PCT No.: PCT/CN2022/140347
§ 371 (c)(1),
(2) Date: Dec. 21, 2023

(87) PCT Pub. No.: WO2023/116691
PCT Pub. Date: Jun. 29, 2023

(65) Prior Publication Data
US 2024/0295950 A1     Sep. 5, 2024

(30) Foreign Application Priority Data
Dec. 20, 2021    (CN) .......................... 202111564700.X

(51) Int. Cl.
G06F 16/74     (2019.01)
G06F 3/0482     (2013.01)
(Continued)

(52) U.S. Cl.
CPC .......... G06F 16/743 (2019.01); G06F 3/0482 (2013.01); G06F 3/0483 (2013.01); G06F 3/0484 (2013.01); G09B 5/065 (2013.01)

(58) Field of Classification Search
CPC ......... G09B 5/02; G09B 5/065; G06F 3/0483; G06F 3/0482; G06F 3/0484;
(Continued)

(56) References Cited

U.S. PATENT DOCUMENTS

2009/0042177 A1* 2/2009 Davis ...................... G09B 3/00
434/350
2010/0021877 A1 1/2010 Butler
(Continued)

FOREIGN PATENT DOCUMENTS

CN     103123567 A     5/2013
CN     105139706 A     12/2015
(Continued)

OTHER PUBLICATIONS

First Office Action for Chinese Patent Application No. 202111564700. X, mailed Oct. 16, 2024, 14 pages.
(Continued)

*Primary Examiner* — Nicholas Ulrich

(57) ABSTRACT

The present application relates to a video collection presentation method and apparatus, an electronic device, and a readable storage medium. The method comprises: presenting a plurality of first videos explaining video clipping skills in a video collection in a second page in the form of a directory, wherein when the video collection is presented by means of a directory, a subdirectory corresponding to the first video comprises a plurality of directory items at different levels.

20 Claims, 7 Drawing Sheets

(51) Int. Cl.
     *G06F 3/0483*      (2013.01)
     *G06F 3/0484*      (2022.01)
     *G09B 5/06*        (2006.01)

(58) Field of Classification Search
     CPC .............. G06F 16/743; H04N 21/2187; H04N
                     21/278; H04N 21/431; H04N 21/44016;
                     H04N 21/4312; H04N 21/482; H04N
                                                   21/4825
     See application file for complete search history.

(56)              References Cited

U.S. PATENT DOCUMENTS

| | | | |
|---|---|---|---|
| 2013/0095464 | A1 | 4/2013 | Ediger et al. |
| 2014/0087349 | A1* | 3/2014 | Kitch ..................... G09B 5/065 |
| | | | 434/308 |
| 2015/0095839 | A1* | 4/2015 | Hombert ................. G06F 16/74 |
| | | | 715/781 |
| 2015/0194064 | A1* | 7/2015 | Young ..................... G09B 5/10 |
| | | | 434/350 |
| 2016/0300503 | A1* | 10/2016 | Diezmann ................ G09B 7/02 |
| 2017/0345322 | A1 | 11/2017 | Digiantomasso et al. |
| 2018/0025658 | A1 | 1/2018 | Takahashi et al. |
| 2018/0108268 | A1* | 4/2018 | Singh ..................... G09B 5/125 |
| 2020/0007942 | A1 | 1/2020 | Stanis et al. |
| 2023/0015943 | A1* | 1/2023 | Ou ........................ G06F 40/166 |
| 2023/0080407 | A1* | 3/2023 | Kumar ................. G06F 40/166 |
| | | | 715/717 |

| | | | |
|---|---|---|---|
| 2023/0224545 | A1* | 7/2023 | Deng .................... H04L 65/611 |
| | | | 725/93 |
| 2023/0252905 | A1* | 8/2023 | Kikuchi .................. G09B 5/02 |
| 2023/0343233 | A1* | 10/2023 | He ..................... H04N 21/4318 |

FOREIGN PATENT DOCUMENTS

| | | |
|---|---|---|
| CN | 107862924 A | 3/2018 |
| CN | 108900917 A | 11/2018 |
| CN | 110555790 A | 12/2019 |
| CN | 110807721 A | 2/2020 |
| CN | 111064995 A | 4/2020 |
| CN | 111274448 A | 6/2020 |
| CN | 112291609 A | 1/2021 |
| CN | 112954440 A | 6/2021 |
| CN | 113342225 A | 9/2021 |
| CN | 113556610 A | 10/2021 |
| WO | 2020065679 A1 | 4/2020 |

OTHER PUBLICATIONS

International Search Report and Written Opinion received for PCT
Patent Application No. PCT/CN22/140347, mailed on Mar. 5, 2023,
11 pages (3 pages of English Translation and 7 pages of Original
Document).
Extended European Search Report for European Application No.
22910003.7, mailed Dec. 18, 2024, 10 Pages.
Office action received from Japanese patent application No. 2024-
537343 mailed on Aug. 19, 2025, 10 pages (5 pages English
Translation and 5 pages Original Copy).

* cited by examiner

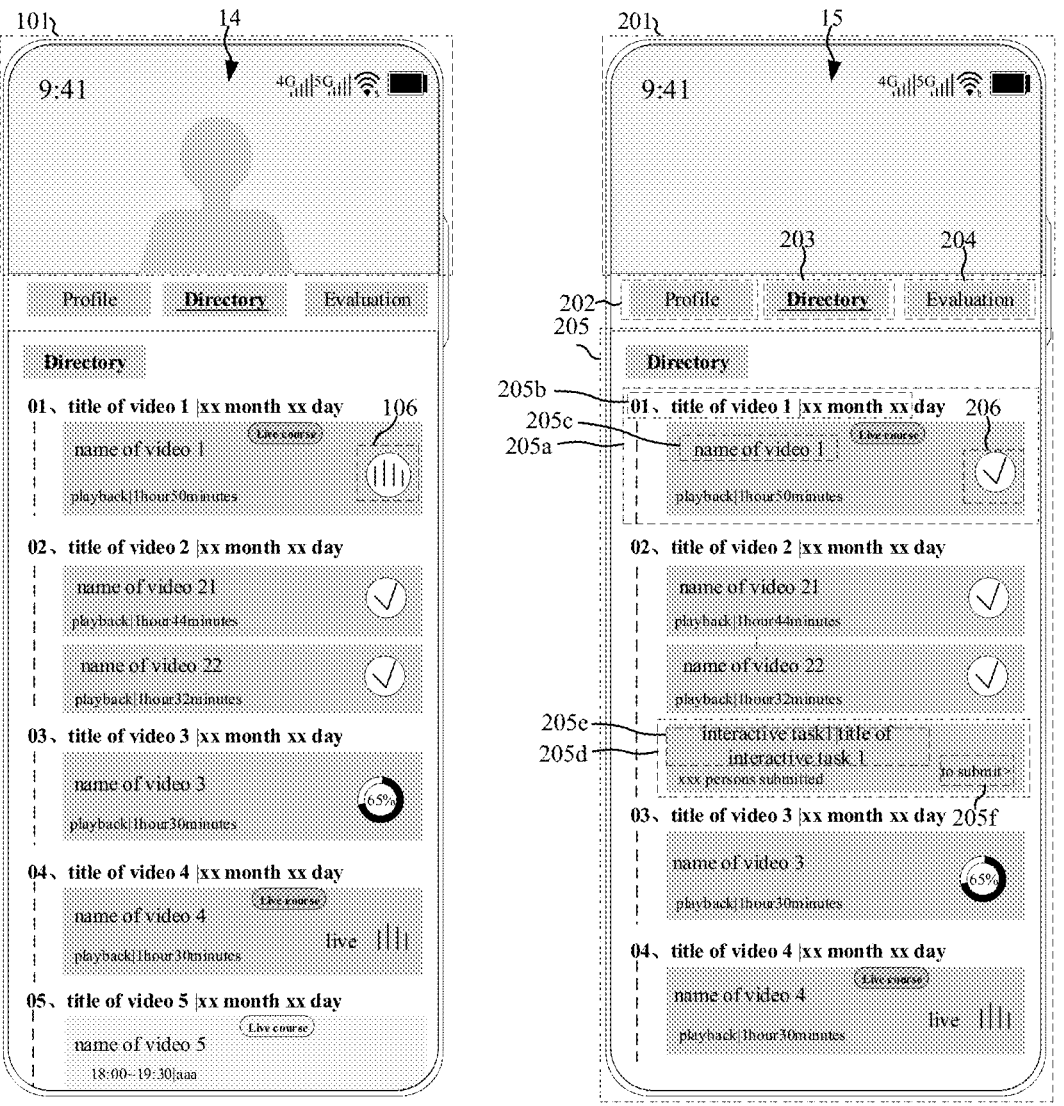
FIG.1D                    FIG.1E presenting a first page, acquiring a trigger operation from a user for a particular entry in the first page; wherein, the particular entry is used for entering a second page which is an information presentation page of the video collection

S201 presenting the video collection detail page in response to the trigger operation for the particular entry; wherein in the video collection detail page, a plurality of video courses included in the video collection are presented in the form of directory; the directory includes a subdirectory corresponding to a first video, a plurality of directory items at different levels included in the subdirectory are used for presenting information relevant to the first video

S202

FIG.2 presenting a first page, acquiring a trigger operation from a user for a particular entry in the first page; wherein, the particular entry is used for entering a second page which is an information presentation page of the video collection

S201 presenting the video collection detail page in response to the trigger operation for the particular entry; wherein in the video collection detail page, a plurality of video courses included in the video collection are presented in the form of directory; the directory includes a subdirectory corresponding to a first video, a plurality of directory items at different levels included in the subdirectory are used for presenting information relevant to the first video

S202 presenting a first tag corresponding to the first video in the second page; the first tag is used for presenting one or more of a course start state of the first video, a progress of the user viewing the first video, a current playing state of the first video

S203 in response to a trigger operation from a user for the background area, entering a live room corresponding to the first video to present a picture of the live room

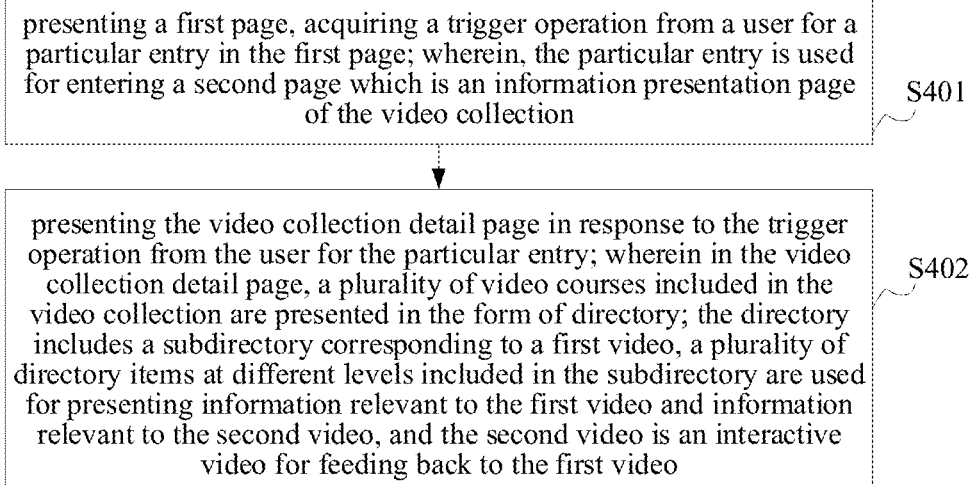

presenting a first page, acquiring a trigger operation from a user for a particular entry in the first page; wherein, the particular entry is used for entering a second page which is an information presentation page of the video collection          S401 presenting the video collection detail page in response to the trigger operation from the user for the particular entry; wherein in the video collection detail page, a plurality of video courses included in the video collection are presented in the form of directory; the directory includes a subdirectory corresponding to a first video, a plurality of directory items at different levels included in the subdirectory are used for presenting information relevant to the first video and information relevant to the second video, and the second video is an interactive video for feeding back to the first video          S402

FIG.4

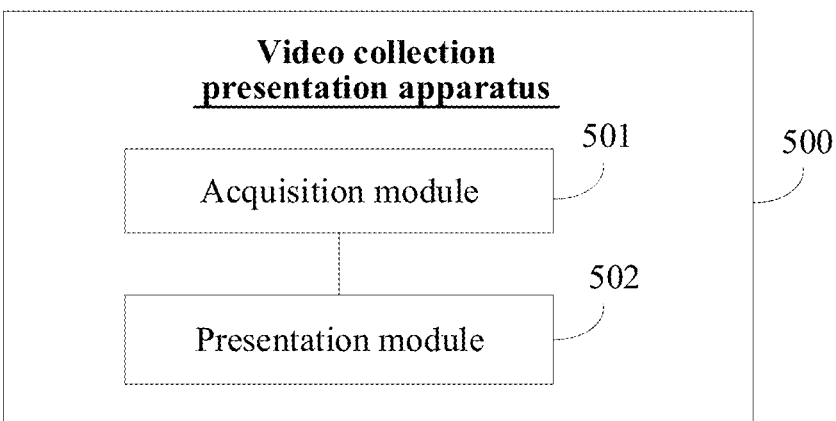

Video collection presentation apparatus

Acquisition module          501

Presentation module          502

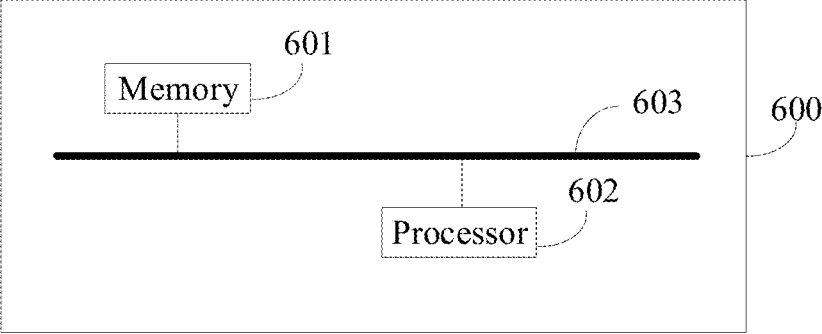

Memory          601

603

Processor          602

VIDEO COLLECTION PRESENTATION METHOD AND APPARATUS, ELECTRONIC DEVICE, AND READABLE STORAGE MEDIUM

CROSS-REFERENCE OF RELATED APPLICATION

This application is a national stage of International Application No. PCT/CN2022/140347, filed on Dec. 20, 2022, which claims the priority of China Patent Application 202111564700.-X filed on Dec. 20, 2021, both of the aforementioned applications are hereby incorporated by reference in their entireties.

FIELD OF THE INVENTION

The present disclosure relates to the field of computer technology, and especially relates to video collection presentation method, apparatus, electronic device and readable storage medium.

BACKGROUND

Viewing video is an important channel for users to understand and learn knowledge, for example, the user may learn video clipping skills from video clipping-related videos, learn image processing skills from image processing-related videos, etc. For the convenience of viewing by the user, usually, the application will render the same kind of videos to the users in the form of collection, and the users can select a video to be watched from the collection to play, so as to learn the contents explained in the video.

DISCLOSURE OF THE INVENTION

In order to solve the above technical problem, the present disclosure provides video collection presentation method, apparatus, electronic device and readable storage medium.

In a first aspect, the present disclosure provides a video collection presentation method, including:

presenting a first page, acquiring a trigger operation from a user for a particular entry in the first page: wherein, the particular entry is used for entering a second page which is an information presentation page of the video collection;

presenting the second page in response to the trigger operation for the particular entry: wherein in the second page, a plurality of first videos included in the video collection are presented in the form of directory: the directory includes a subdirectory corresponding to the first video, the subdirectory corresponding to the first video includes a plurality of directory items at different levels, the directory items at different levels are used for presenting information relevant to the first video and information relevant to a second video, and the second video is an interactive video for feeding back to the first video.

In a second aspect, the present disclosure provides a video collection presentation apparatus, comprising:

a presentation module configured to present a first page;

an acquisition module configured to acquire a trigger operation from a user for a particular entry in the first page: wherein, the particular entry is used for entering a second page which is an information presentation page of the video collection;

a presentation module configured to present the second page in response to the trigger operation for the particular entry: wherein in the second page, a plurality of first videos included in the video collection are presented in the form of directory: the directory includes a subdirectory corresponding to the first video, the subdirectory corresponding to the first video includes a plurality of directory items at different levels, the directory items at different levels are used for presenting information relevant to the first video and information relevant to a second video, and the second video is an interactive video for feeding back to the first video.

In a third aspect, the present disclosure provides an electronic device comprising: a memory and a processor:

wherein the memory is configured to store computer program instructions;

wherein the processor is configured to execute the computer program instructions to cause the electronic device to implement the video collection presentation method as described in any one of the first aspects.

In a fourth aspect, the present disclosure provides a readable storage medium comprising: computer program instructions: the computer program instructions, when executed by at least one processor of an electronic device, cause the electronic device to implement the video collection presentation method as described in any one of the first aspects.

In a fifth aspect, the present disclosure provides a computer program product, which, when executed by a computer, causes the computer to implement the video collection presentation method as described in any one of the first aspects.

In a sixth aspect, the present disclosure provides a computer program comprising program codes that, when executed by a computer, causes the computer to implement the video collection presentation method as described in any one of the first aspects.

DESCRIPTION OF THE DRAWINGS

The accompanying drawings, which are incorporated in and constitute a part of this specification, illustrate embodiments consistent with the disclosure and, together with the description, serve to explain the principles of the disclosure.

In order to illustrate the embodiments of the present disclosure or the technical solutions in the prior art more clearly, the following briefly introduces the accompanying drawings needed in the description of the embodiments or the prior art. It is obvious for those of ordinary skill in the art that other accompanying drawings also can be obtained according to the accompanying drawings without paying creative work.

FIG. 1A to 1H are schematic diagrams of a human-machine interaction interface according to an embodiment of the present disclosure:

FIG. 2 is a flowchart of a video collection presentation method according to an embodiment of the present disclosure;

FIG. 3 is a flowchart of a video collection presentation method according to an embodiment of the present disclosure:

FIG. 4 is a flowchart of a video collection presentation method according to an embodiment of the present disclosure:

FIG. 5 is a schematic structural diagram of a video collection presentation apparatus according to an embodiment of the present disclosure:

FIG. 6 is a schematic structural diagram of an electronic device according to an embodiment of the present disclosure.

DETAILED DESCRIPTION OF PREFERRED EMBODIMENTS

Figure 1A:
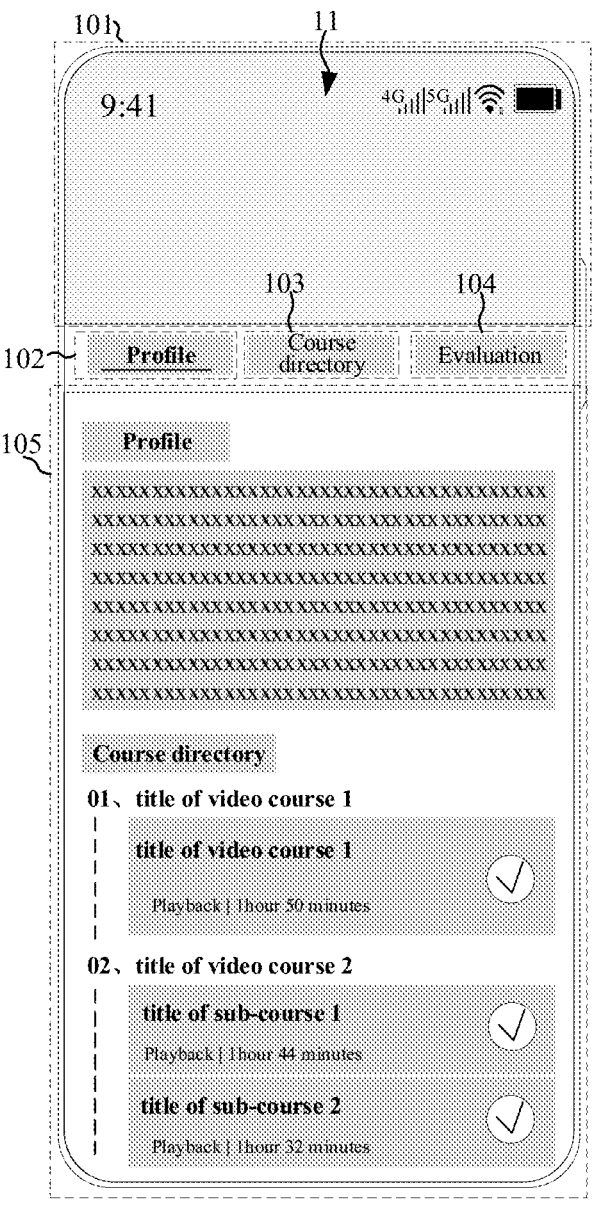

In order to be able to understand the above objects, features and advantages of the present disclosure more clearly, the solutions of the present disclosure will be further described below. It should be noted that the embodiments of the present disclosure and the features in the embodiments can be combined with each other without conflict.

In the following description, numerous specific details are set forth in order to provide a thorough understanding of the present disclosure, but the present disclosure may be practiced in other ways than as described herein: obviously, the embodiments in the specification are only a part of the embodiments of the present disclosure, but not all of the embodiments.

At present, an application can present the video collection in the form of directory list, however, the structure of the directory list adopted by the application is relatively simple, which seriously affects the user's interest in viewing videos in the video collection.

The present disclosure provides a video collection presentation method, apparatus, an electronic device, a readable storage medium and a computer program product, wherein the method presents a plurality of first videos included in the video collection in the second page in the form of directory: when the video collection is presented in the directory form, a subdirectory corresponding to the first video can include a plurality of directory items at different levels, by using the above directory items at different levels to present information relevant to the first video and information relevant to a second video for feeding back to the first video, the user can acquire more information relevant to the first video through directory items at different levels, so that the interest of the user in viewing the first video can be improved. In addition, by adopting the directory items with upper and lower hierarchical relationships to present the information relevant to the first video, the structure of the second page becomes clearer, the hierarchy becomes richer, and better visual experience can be brought to the user.

Among them, a first video included in the video collection may be a live video, or also can be a pre-recorded video, that is, the plurality of first videos in the video collection may all be live videos, or may all be pre-recorded videos, alternatively, the video collection may include both the live video and the pre-recorded video, and the present disclosure does not limit this. If the video may be published in other manners, the video collection may also include the first video published in other manners.

It should be noted that the first video may be a live video, that may be construed as video contents obtained by the user through entering a live room and viewing a live picture.

In addition, the present disclosure does not limit parameters of the first video, such as contents, duration, etc. of the first video. The first video may be an explanatory video relevant to any video clipping skill, for example, a video explaining a video clipping skill: the present disclosure does not limit the type of video clipping skill, for example, the video clipping skills may be video toning skills, food shooting skills, scenery shooting skills, small fresh style video production skills, etc. It should be noted that the present disclosure may also be applied to videos containing other contents, and may similarly enhance the user's interest in viewing the video, and may provide a better visual experience to the user.

In addition, a course start time may also be configured for the first video, and positions of the subdirectories in the entire directory structure corresponding to the plurality of first videos in the video collection may be sequentially arranged in order of course start times of the first videos. The earlier the course start time is, the more forward the subdirectory corresponding to the first video is located in the entire directory structure, and the later the course start time is, the more backward the subdirectory corresponding to the first video is located in the entire directory structure.

In some cases, when the details of the video collection are presented in the second page, a first tag corresponding to the first video may also be presented in the second page, and one or more of a course start state of the first video, a progress of the user viewing the first video, a current playing state of the first video, and the like may be indicated by first tags in different states. In addition, the user may play the first video by operating the first tag.

In some cases, one or more interactive tasks may also be configured for the video collection, so that a user may feed back one or more second video, wherein the second video may be construed as a video clipped by a user using video clipping skills explained in one or more first videos, therefore, a directory item relevant to a second video may also be configured in a second page, enabling the user to clearly learn the information relevant to the second video according to the directory item relevant to the second video. Furthermore, in the process of clipping the second video, the user can continuously familiarize and master the video clipping skills explained in the video collection, and meanwhile, the user is familiar with the video clipping skills in an interactive mode, so that the interesting can be enhanced, and the interest of the user in shooting, clipping and publishing the video can be improved.

In some cases, for the second video, in the second page, the completion progress of the second video may also be presented, the completion progress may include several states, for example, completed, to be uploaded, under review, etc. In addition, a second tag can be configured for the second video, and the user can enter a third page by operating the second tag, and through the third page, the user can obtain more relevant information about the second video and perform operations relevant to the second video through the entry or tag provided in the third page.

Among them, the video collection presentation method of the present disclosure may be performed by a video collection presentation apparatus provided by the embodiments of the present disclosure, the apparatus may be implemented by any software and/or hardware. The video collection presentation apparatus may be a tablet computer, a mobile phone (such as a folding screen mobile phone, a large screen mobile phone, and the like), a wearable device, a vehicle-mounted device, or an augmented reality (AR)/virtual reality (VR) devices, laptops, ultra-mobile personal computers (UMPC), netbooks, personal digital assistants (PDAs), smart televisions, smart screens, high-definition televisions, 4K televisions and other Internet of Things (IOT) devices, the present disclosure does not limit specific types of electronic devices.

The present disclosure does not limit the type of an operating system for the electronic device, for example, an Android system, a Linux system, a Windows system, an iOS system, and the like.

Based on the foregoing descriptions, the present disclosure will take the electronic device as an example, with reference to the accompanying drawings and application scenarios, to elaborate in detail the video collection presentation method provided by the present disclosure.

In conjunction with FIGS. 1A to 1H, a specific implementation process of the video collection presentation method according to the present disclosure will be introduced. For convenience of explanation, in FIGS. 1A to 1H, the electronic device is a mobile phone, an APP 1 (Application 1 for short) is installed in the mobile phone and can provide a video collection, which includes a plurality of first videos.

Reference is made to FIGS. 1A to 1H which are schematic diagrams of human-machine interaction interfaces provided by embodiments of the present disclosure, and the methods provided by the present disclosure will be respectively introduced below for two situations in which the second video is not required to be fed back and the second video is required to be fed back with respect to the video collection.

In the following embodiment, it is assumed that the video collection includes 10 videos, denoted as video 1 to video 10, respectively, where video 1 to video 4 all have started, and the next video to start is video 5.

Case 1. It Does not Need to Feedback the Second Video with Respect to the Video Collection Under the condition that it does not need to feedback the second video with respect to the video collection, the application 1 can present each first video included in the video collection through a directory, wherein the directory can include subdirectories corresponding to each first video respectively, for example, the application 1 can present 10 videos included in the video collection through the directory, and the directory can include subdirectories corresponding to the video 1 to the video 10 respectively.

Exemplarily, the application 1 receives a trigger operation from a user for a particular entry for entering a video collection detail page, the application 1 may exemplarily display the user interface 11 shown in FIG. 1A on the mobile phone, and the user interface 11 is used for presenting the video collection detail page.

Among them, the user interface 11 includes a background area 101, a tag 102, a tag 103, a tag 104 and an area 105.

The background area 101 is a head area of the video collection detail page. In the present disclosure, parameters of the background area 101, such as an area size, an area position, an area shape and the like, are not limited. For example, the background area 101 may be rectangular and located at the top of the video collection detail page.

At different stages, the background area 101 may present different information.

For example, in a stage that a video in the video collection has not started, the background area 101 may present an image set by the user or a default image set by the application 1: when the time before the course starts meets a preset duration, the background area 101 may present information about countdown to course starting of the nearest video, or in a stage that no first video starts, the background area 101 may also present a short video produced for the video collection.

When a video in the video collection arrives at its course start time, in response to the trigger operation from the user, the application 1 may also present a picture of the video meeting the playing condition in the background area 101, or when some videos in the video collection arrive at their course start times, information about countdown to a next upcoming first video can also be presented in the background area 101.

Figure 1B:
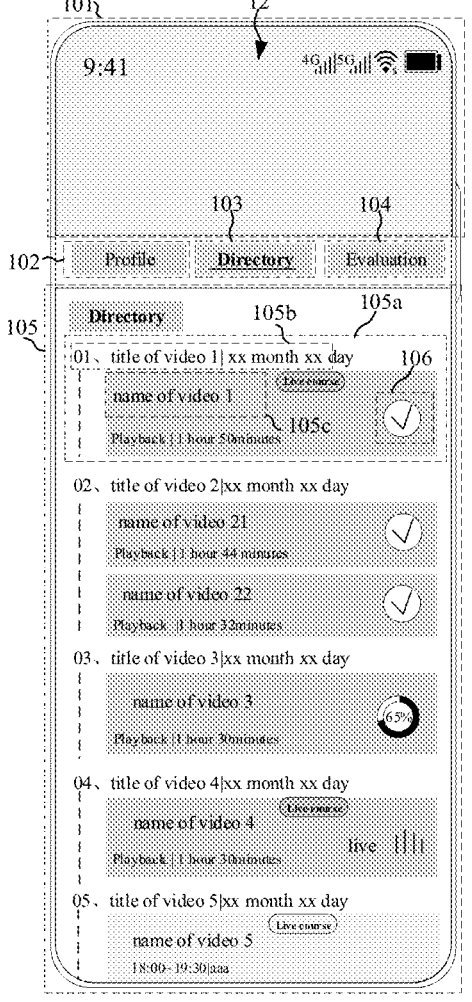

Illustratively, in the embodiment shown in FIG. 1B, information about countdown to a next upcoming first video (assumed to be video 5) can also be presented in the background area 101, and can be presented in a style of 'xx days, xx hours, Xx minutes and xx seconds', certainly, the countdown information may also be presented in other styles, the disclosure does not limit the presentation style of the specific countdown information.

By fully utilizing the background area to present the information relevant to the video collection, a user, when entering the video collection detail page, can obtain more relevant information about the video collection through the background area, so that the interest of the user in viewing the video is improved.

The tag 102 can be used to trigger the application 1 to display profile information of the video collection in the area 105. The present disclosure does not limit the implementation of the tag 102, the tag 102 may be implemented in one or more forms such as text, icon, symbol, and the like. For example, in FIG. 1A, the tag 102 can be implemented by the text "profile".

The tag 103 can be for triggering the application 1 to display information relevant to a plurality of first videos included in the video collection in the area 105 in the form of directory. The present disclosure does not limit the implementation of the tag 103, the tag 103 may be implemented in one or more forms such as text, icon, symbol, and the like. For example, in FIG. 1A, the tag 103 can be implemented by the text "course".

The tag 104 can be used to trigger the application 1 to display information about the evaluation for the video collection in the area 105. The present disclosure does not limit the implementation of the tag 104, the tag 104 may be implemented in one or more forms such as text, icon, symbol, and the like. For example, in FIG. 1A, the tag 104 can be implemented by the text "evaluation".

As shown in FIG. 1A, upon entering the video collection detail page, the application 1 can locate to the tag 102 by default, that is, the profile information of the video collection is displayed in the area 105 by default. Among them, displaying the profile information of the video collection means displaying the profile information close to the top of the area 105. Since the content of the profile information may not occupy the whole area 105, so that the detailed content of a part of the directory can be displayed in the area 105.

In a possible implementation, upon receipt of the trigger operation from the user for the tag 103, the application 1 can locate to the tag 103, and the directory corresponding to the video collection can be displayed in the area 105, that is, the directory corresponding to the video collection can be displayed close to the top of the area 105.

In another possible embodiment, upon receipt of a sliding operation from the user in the area 105, the application 1 may display the directory corresponding to the video collection in the area 105, and may locate to the tag 103 when the directory is displayed in the area 105.

Among them, the directory corresponding to the video collection may adopt a multi-level directory structure. The disclosure does not limit the number of levels of the directory structure.

In a possible implementation, the application 1 receives a trigger operation from the user with respect to the tag 103, and the user interface 12 shown in FIG. 1B is exemplarily displayed on the mobile phone.

Figure 1C:
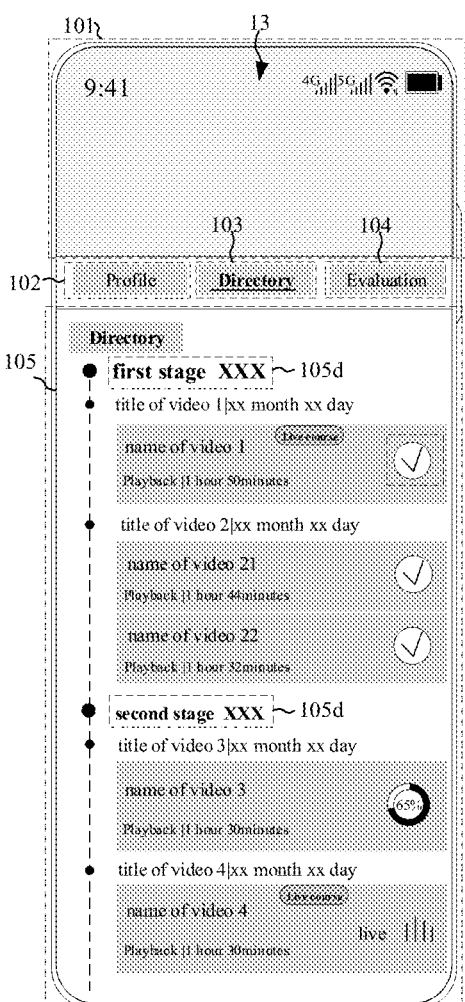

In a possible implementation, the application 1 receives a trigger operation from the user with respect to the tag 103, and the user interface 12 shown in FIG. 1C is exemplarily displayed on the mobile phone.

Among them, the user interface 12 shown in FIG. 1B and the user interface 13 shown in FIG. 1C both adopt a multi-level directory structure to display the details of the video collection, but the difference lies in that the levels of the directories are different, that is, the structures of the directories are different.

In conjunction with the user interface 12 shown in FIG. 1B and the user interface 13 shown in FIG. 1C, when the video collection is presented in the area 105 in the form of directory, a position of a subdirectory corresponding to each first video in the entire directory structure may be determined in order of course start times of the first videos, The earlier the course start time is, the more forward the subdirectory corresponding to the first video is located in the entire directory structure, and the later the course start time is, the more backward the subdirectory corresponding to the first video is located in the entire directory structure.

The multi-level directory structure shown in FIGS. 1B and 1C, respectively, is described in detail below, wherein the embodiment shown in FIG. 1B adopts a two-level directory structure and the embodiment shown in FIG. 1C adopts a three-level directory structure.

(1) Two-Level Directory Structure

With reference to FIG. 1B, in the area 105, the first video may correspond to a presentation area 105*a*, and the presentation area 105*a* is used for presenting a subdirectory corresponding to the first video, wherein the subdirectory corresponding to the first video may include directory items of two levels, namely a directory item 105*b* and a directory item 105*c*, and the directory item 105*c* may be construed as a subdirectory item of the directory item 105*b*: where the directory item 105*b* may present the first information of the first video, and the directory item 105*c* may present the second information of the first video, for example, the first information of the first video may, but not limited to, include the title, course start time, etc. of the first video, and the second information of the first video may, but not limited to, include the name of the first video, the nickname of the publisher, etc.

In addition, other information relevant to the first video, for example, the duration of the first video, the nickname of the publisher of the first video, the type of the first video, and the like, may also be presented in the presentation area 105*a*. The type of the first video mentioned here indicates that the first video is a live video or a pre-recorded video.

In some cases, the first video may include a plurality of sub-videos, a directory item 105*b* may be included in a presentation area corresponding to the first video, the directory item 105*b* corresponds to a plurality of directory items 105*c* at next lower level, and each directory item 105*c* is associated with a sub-video.

For example, as shown by video 2 in FIG. 1B, it is assumed that the video 2 includes 2 sub-videos, namely the video 21 and the video 22, respectively, so that the directory item 105*b* corresponding to the video 2 may include two directory items 105*c* at next lower level, and the two directory items 105*c* at next lower level are used for presenting the name of the video 21 and the name of the video 22, respectively.

FIG. 1B shows a case that the first video includes 2 sub-videos, in an actual application, the first video may also include a larger number of videos, whose implementation manner is similar, and will not be repeated here for the sake of simplicity and clarity. And in an actual application, there may also be a case that none of all the first videos in the video collection does not include any sub-video.

In addition, when the video collection is presented in the video collection detail page, the subdirectory corresponding to the first video can also include a sequence number corresponding to the first video, so that the user can clearly know the sequence of the first videos in the video collection, and the user can conveniently search the video desired to be known according to the sequence number.

(2) Three-Level Directory Structure

Compared with the directory structure shown in FIG. 1B, the directory structure shown in FIG. 1C has more levels and a more complex structure. It shall be understood that the directory shown in FIG. 1C can present more information relevant to the video collection.

Referring to FIG. 1C, the overall directory corresponding to the video collection can further include one or more directory items 105*d*, and the directory items 105*d* may be a next upper-level directory item of the subdirectories corresponding to one or more first videos respectively.

Among them, the directory item 105*d* may be used to express information relevant to one or more associated first videos. The present disclosure does not limit the specific information expressed by the directory item 105*d*. For example, referring to FIG. 1C, the directory item 105*d* is used to express information about a learning stage to which the plurality of associated first videos belong, that is, different learning stages can be divided in advance, and each learning stage may correspond to one or more first videos in the video collection, so that through the directory item 105*d*, the user can clearly know the overall arrangement of the video collection and clearly know which learning stage the user is currently in.

For example, referring to FIG. 1C, the first directory item 105*d* is used to indicate that video 1 and video 2 belong to the first stage, video 3 to video 5 belong to the second stage, video 6 to vide 9 belong to the third stage, video 10 is in the fourth stage, Thus, the directory can include 4 directory items 105*d*, where the first directory item 105*d* serves as a upper directory item of the first subdirectory corresponding to the video 1 and the first subdirectory corresponding to the video 2, indicating that the video 1 and the video 2 belong to the first stage, and the first directory item 105*d* may express the above information by a text "first stage XXX", where "XXX" may indicate a subject of the first stage: similarly, the second directory item 105*d* serves as a upper directory item of the first subdirectory corresponding to the video 3, the first subdirectory corresponding to the video 4, and the first subdirectory corresponding to the video 5, indicating that video 3, video 4 and video 5 belong to the second stage, the second directory item 105*d* may express the above information by the text "second stage XXX", where "XXX" may indicate the subject of the second stage: similarly, the third directory item 105*d* serves as a upper directory item of the first subdirectories corresponding to the video 6 to the video 9, respectively, indicating that the video 6 to the video 9 belong to the third stage, and the third directory item 105*d* may express the above information by the text "third stage XXX", where "XXX" may indicate the subject of the third stage: similarly, the fourth directory item 105*d* serves as a upper directory item of the first subdirectory corresponding to the video 10, indicating that the video 10 belongs to the fourth stage, and the fourth directory item 105d can express the above information by the text 'fourth stage XXX', wherein 'XXX' can indicate the subject of the fourth stage.

Referring to FIG. 1C, the above four directory items 105d belong to the same level of directories in the directory structure, and due to the constraint by the screen size of the mobile phone, only the first directory item 105d and the second directory item 105d are shown in the user interface shown in FIG. 1C, and the application 1 can present the third directory item 105d and the fourth directory item 105d in response to a sliding operation from the user with respect to the area 105.

It should be noted that the directory item 105d is not limited to express the information about the learning phase corresponding to the plurality of associated first videos, and may also express other information, such as time node information, etc., the disclosure does not limit specific information content.

In the user interface shown in FIG. 1C, the implementation of the presentation area 105a and the implementation of the subdirectory corresponding to the first video are similar to those shown in FIG. 1B, and reference may be made to the description of the embodiment shown in FIG. 1B, which will not be repeated here for the sake of brevity.

It should be noted that the two-level directory structure and the three-level directory structure shown in FIG. 1B and FIG. 1C respectively are only examples, and in an actual application, a directory list with more levels can be used to present the video collection.

Next, based on the user interface 12 shown in FIG. 1B, the video collection presentation method provided by the present disclosure will be described in detail.

When the video collection detail page is presented, a tag may be further configured for the first video, and one or more of a course start state of the first video, a progress of the user viewing the first video, and a current playing state of the first video are indicated according to different states corresponding to the tag: in addition, the user can also operate the tag to play the first video.

The present disclosure does not limit an implementation manner of the tag corresponding to the first video, and the tag corresponding to the first video may be implemented in one or more forms such as text, symbol, animation, number, etc., Different states of the tag corresponding to the first video can be implemented in different forms.

For example, when the tag corresponding to the first video is in a first state (which may also be construed as a playing state), it may be indicated that the user is currently playing the first video. The first state may also indicate that the first video is in a state that the course has started. Exemplarily, the tag corresponding to the first video being in the first state may be implemented by means of animation, text, or the like.

When the tag corresponding to the first video is in a second state, it may be indicated that the first video is currently in a state that the course is starting. Exemplarily, assuming that the first video is a live video, an icon corresponding to the second state may be presented to prompt the user that the content of the first video is being explained in the live room.

When the tag corresponding to the first video is in a third state, it may be indicated that the user has learned the whole content of the first video. The third state can also present that the first video has started, has a play progress, and is not currently playing. Exemplarily, that the tag corresponding to the first video is the third state can be implemented in any form, for example, the third state can be implemented in a manner that a circle overlaps the center of a tick, which indicates that the user has learned the entire content of the video course.

When the tag corresponding to the first video is in a fourth state, it may be indicated that the user has learned a part of content of the first video. The fourth state can also present that the first video has started, has a play progress, and is not currently playing. Exemplarily, that the tag corresponding to the first video is the fourth state can be implemented in combination of a number and an icon, and the progress of the user learning the first video can be displayed by each of the number and the icon.

When the tag corresponding to the first video is in a fifth state, it may be indicated that the first video is in a state that the course has started, while the user has not started to learn the content of the first video. Exemplarily, that the tag corresponding to the first video being the fifth state may be implemented in a form of symbol, and the symbol may guide the user to operate and play the first video, so that the user can know that the first video has not been learned at present yet, while the first video can be viewed and learned.

When the tag corresponding to the first video is in a sixth state, it may be indicated that the first video is in a state that the course has not started at present yet. For example, the sixth state may be a hidden state, that is, if the tag corresponding to the first video is not displayed in the presentation area corresponding to the first video, it may be indicated that the first video is in a state that the course has not started at present yet, and the user cannot perform an operation on the first video.

It should be noted that the tag corresponding to the first video being in different states may be implemented in any manner, which is merely an example, instead of limiting implementation manners of different states.

Continue to refer to FIG. 1B, the user interface 12 further includes a tag 106 corresponding to a video course. In the user interface 12, the first 5 video courses in the presented video collection are taken as an example to illustrate six states of the tag corresponding to the video course and switching modes between the six states.

In conjunction with the foregoing, Application 1 supports playing or previewing a picture of the first video in the background area of the video collection detail page, Suppose that the user has previously learned the whole content of the video 1, in the embodiment shown in FIG. 1B, The tag 106 corresponding to the video 1 can be in the third state, the application 1 receives a trigger operation from the user for the tag 106 to which the video 1 corresponds, and the user interface 14 shown in FIG. ID is exemplarily displayed. Referring to the user interface 14 shown in FIG. 1D, the application 1 plays the video 1 in the background area 101, and the state of the tag 106 corresponding to the video course 1 in the directory list is switched from the third state to the first state, indicating that the video 1 is currently being played via animation.

Assuming that the user has learned the whole content of the video 2, as shown in FIG. 1B, the tag 106 corresponding to the video 2 is in the third state, and the third state corresponding to the tag 106 is implemented in a manner that a circle overlaps the center of a tick, and the user can know that the whole content of the viode course has been learned via the pattern.

Similarly, since video 2 is a video that has been learned, the application 1 supports playback of the video that has been learned, therefore, the application 1 receives a trigger operation for the tag 106 of the video 2, and the application 1 plays the picture of the video 2 in the background area 101.

And the state of the tag 106 corresponding to the video 2 in the directory list is switched from the third state to the first state, and that the video 2 is being played at present is indicated in a manner of animation. The manner of page display is similar to that of FIG. 1D, which is not repeated here for the sake of brevity.

Suppose that the user has learned a part of the content of the video 3, for example, 65% of the content, referring to FIG. 1B, the tag 106 corresponding to the video 3 is in a fourth state, and the fourth state corresponding to the tag 106 can be implemented in a manner that an area in the ring pattern filled with a particular color is combined with the number "65%". The user can clearly know the learning progress of the video 3 through the area in the ring pattern filled with the particular color and the number.

Similarly, since the video 3 is a video that has been learned, but not learned completely, the application 1 supports playback of the video 3, therefore, the application 1 receives a trigger operation for the tag 106 of the video 3, and the application 1 plays the picture of the video 3 in the background area 101. And the state of the tag 106 corresponding to the video 3 in the directory list is switched from the fourth state to the first state, and that the video 3 is being played at present is indicated in a manner of animation. The manner of page display is similar to that of FIG. 1D, which is not repeated here for the sake of brevity In addition, along with the progress of the user learning the video 3, the application 1 can update the state of the corresponding tag 106. For example, when the user completes learning the whole content of the video 3 at this time, the tag 106 corresponding to the video 3 can be switched from the first state to the third state at the end of playing the video 3, so that the user can clearly know that the whole content of the video 3 has been learned.

Suppose that video 4 is a live video, and the content of the video 4 is being explained in the current live room, as shown in FIG. 1B, the tag 106 corresponding to the video 4 is in the second state, and that the tag 106 corresponding to the video 4 is in the second state can be implemented through combination of a text "Live" and an animation. The user can clearly know that the content of the video is being explained in the live room through the text "Live" and the animation.

Since video 4 is a live course, and is currently in live, in order to facilitate a user to preview the video and to enter a live room to learn the content of the video, therefore, the application 1 receives a trigger operation for the tag 106 of the video 4, the application 1 plays a picture of the live room corresponding to the video 4 in the background area 101. The state of the tag 106 corresponding to the video 4 in the directory list may be kept in the second state unchanged. The page display manner is similar to that of FIG. 1D, which is not repeated herein for the sake of brevity. In addition, the user may enter the live room corresponding to the video 4 by operating (for example, clicking) the background area.

The above-mentioned video 1 to video 3 are all in a state that the course has started, and the user can play back the video course by operating the corresponding tag 106.

The tag 106 corresponding to the video 5 is in a sixth state, that is, the tag 106 corresponding to the video 5 is in the hidden state, which indicates that the video 5 does not arrive at the course start time at present.

Since video 5 does not arrive at the course start time at present, the picture of the video 5 cannot be played back yet, if the application 1 receives a trigger operation for the presentation area corresponding to the video 5, the application 1 may display a preset prompt message, for example, the application 1 may display a prompt window, and a text prompt content "The course has not started yet, please wait patiently" can be displayed in the prompt window. Of course, the text prompt content is not limited to the foregoing example, and the prompt window may also be combined with other manners such as animation, sound and the like to prompt the user that the course start time of the video is not arrived yet at present.

It should be noted that the state of the tag 106 corresponding to each video in the video collection can be switched among the first state to the sixth state, according to the course start time, the learning situation of the user and the trigger operation from the user.

It should also be noted that the number of states, with which the tag 106 can be configured according to actual requirements, is not limited to the above 6 states for the tag 106, and in an actual application, the number of states can be less or more, which is not limited in the present disclosure.

Case 2. It Needs To Feedback the Second Video with Respect to the Video Collection.

Under the condition that it needs to feedback the second video with respect to the video collection, when the application 1 presents the information of the video collection through the directory, the directory item corresponding to the second video may serve as a directory item in the subdirectories corresponding to the first video, to express the information relevant to the second video.

In some cases, after the user has viewed the first video in the video collection, the user can upload a second video that is obtained by video clipping based on video clipping skills explained in the first video, and the clipped second video uploaded by the user can be scored, audited and the like by the application 1 automatically or manually, then the comprehensive evaluation result of the second video can be fed back to the user. In an interactive manner, the user can be familiar with and master the video clipping skills explained in the first video.

In order to enable the user to clearly know detailed information of the second video, the information relevant to the second video and the information relevant to the video collection can be presented in the directory aggregatedly.

The application 1 receives a trigger operation from a user for a particular entry for entering a video collection detail page, the application 1 may exemplarily display the user interface 15 shown in FIG. 1E on the mobile phone, and the user interface 15 is used for presenting the video collection detail page.

Among them, the user interface 15 includes a background area 201, a tag 202, a tag 203, a tag 204 and an area 205.

The implementations of the background area 201, the tag 202, the tag 203, and the tag 204 in the embodiment shown in FIG. 1E are similar to that of the background area 101, the tag 102, the tag 103, and the tag 104 in the embodiment shown in FIG. 1A, and reference may be made to the detailed description of the embodiment shown in FIG. 1A, which will be not repeated herein for the sake of brevity.

The area 205 differs from the area 105 in that the application 1 presents a plurality of first videos included in the video collection and a second video in the area 205 in the form of a directory when the tag 203 is located to.

In some cases, the second video may be associated with a first video specified in the video collection, and it can be understood that the second video is an interactive video feedback by the user to the associated first video, and in order to improve the association between the second video and the first video in the directory, the position of a directory item in the entire directory structure corresponding to the second video can be determined according to the position of the subdirectory corresponding to the associated first video in the directory structure.

In other cases, the second video may not be configured with an association relationship with the first video, and the position of the directory item in the entire directory structure corresponding to the second video may be determined according to the time of publishing feedback of the second video.

Two Different Scenarios will be Described Below:

(1) The Second Video is Associated with the First Video

With reference to FIG. 1E, it is assumed that the application 1 may use a two-level directory structure to present a subdirectory corresponding to the first video and a directory item corresponding to the second video in the area 205. It should be noted that the application 1 may also use a directory structure having more levels for presentation in the area 205, which is not limited in the present disclosure.

With reference to FIG. 1E, in area 205, the first video may correspond to a presentation area 205a, the presentation area 205a includes the subdirectory corresponding to the first video, the subdirectory includes a directory item 205b and a directory item 205c, and the directory item 205c is a subdirectory item of the directory item 205b. Among them, the directory item 205b and the directory item 205c are respectively similar to the directory item 105b and the directory item 105c in the embodiment shown in FIG. 1A, and refer can be made to the detailed description of the embodiment shown in FIG. 1A, which will not be repeated herein for the sake of brevity.

In addition, the second video corresponds to a presentation area 205d, the presentation area 205d includes a directory item 205e corresponding to the second video, and the directory item 205e can present information relevant to the second video, for example, the directory item 205e presents a name, a subject, a shooting requirement, a clipping requirement and the like of the second video.

When the second video is associated with the first video, the position of the directory item in the entire directory structure corresponding to the second video is relevant to the position of the subdirectory in the entire directory structure corresponding to the associated first video, wherein the directory item corresponding to the second video is one directory item in the subdirectorys corresponding to the associated first video.

Referring to FIG. 1E, it is assumed that video 2 corresponds to a second video, a directory item corresponding to the second video is located below a subdirectory corresponding to video 2, and the directory item corresponding to the second video is one directory item in the subdirectory corresponding to video 2.

In addition, the presentation area 205d can also include a tag 205f, through which the state of the second video can be presented, and the detail page of the second video can be accessed.

The present disclosure does not limit the implementation of the tag 205f, for example, the tag 205f may be implemented in one or more ways such as text, icon, symbol, and dynamic effect. Exemplarily, as shown in FIG. 1E, the video clip task is currently in a state of to-be-submitted, so that it may be implemented in combination with the word "to-be-submitted" and can be combined with a symbol ">" to indicate an entry to the detail page of the second video.

In addition, other information relevant to the second video, such as the publication state, the number of submission persons, the expiration date and the like, corresponding to the second video may be presented in the presentation area 205d.

The application 1 receives a trigger operation for an entry for entering the detail page of the second video, the application 1 may jump to the detail page of the second video, the detail page of the second video may present the details of all the second videos relevant to the video collection in the form of a list, and for each second video, it may be provided an entry for the user to upload the clipped second video. The disclosure does not limit the specific implementation manner of the detail page of the second video.

(2) The Second Video is not Associated with the First Video

The second video may not be configured with an association relationship with the first video, and the position of the directory in the entire directory structure corresponding to the second video may be determined according to the task publication time for the second video.

Illustratively, assume that the publication times of the first five videos in the video collection are October 1st, October 3rd, October 5th, October 7th, October 10th, sequentially, and two interactive videos need to be fed back with respect to the video collection, that is to say, two second videos need to be fed back, and since the association relationships between the two second videos to be fed back and the first video are not configured, the position of the directory item corresponding to the second video in the entire directory structure can be determined according to the time of the publisher publishing the task of feeding back the second video.

Figure 1F:
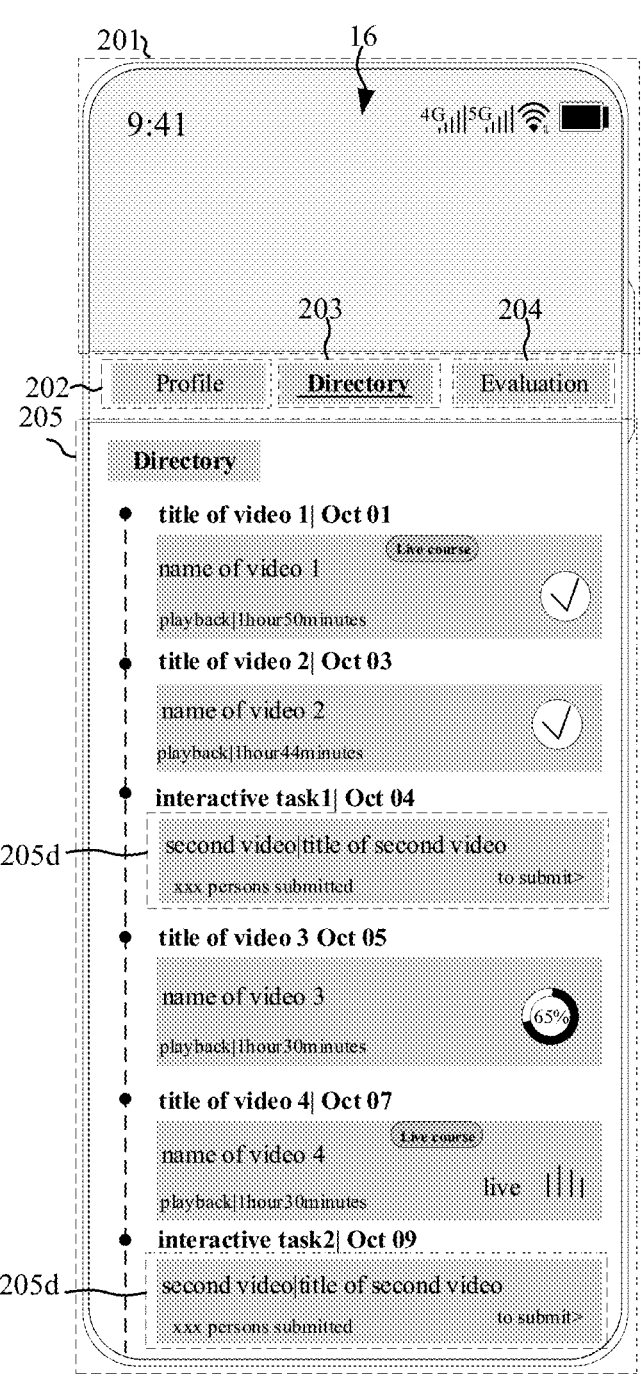

Illustratively, as shown in FIG. 1F, assuming that the interactive task publication time corresponding to the second video 1 is October 4, the interactive task publication time corresponding to the second video 2 is October 9th, therefore, in the directory, the position of the directory item corresponding to the second video 1 in the entire directory structure is located below the subdirectory corresponding to the video 2, and the position of the directory item corresponding to the second video 2 in the entire directory structure is located below the subdirectory corresponding to the video 4.

Referring to FIG. 1F, when the second video is not associated with the first video, the directory item corresponding to the second video and the subdirectory corresponding to the first video belong to the same level in the entire directory structure.

Similarly, if a three-level directory structure is used to present the video collection and the directory items corresponding to the second video, the implementation manner of the directory item corresponding to the second video in the entire directory structure is similar to that when a two-level directory structure is adopted to present the video collection and the information relevant to the second video. For the sake of brevity, details are not described herein again. For example, a directory item at a higher level may be set for a subdirectory corresponding to the first video and a directory item corresponding to the second video, to express information relevant to the first video and the second video.

In addition, in order to facilitate the user to quickly find the position of the first video viewed last time, the application 1 can locate the position of the subdirectory to be presented according to the last first video viewed by the user last time when presenting the video collection detail page.

Among them, if the last first video viewed by the user last time has not been played completely, the directory position may be located to the position of the subdirectory corresponding to the first video that has not been played completely last time: if the last first video played by the user last time has been played completely, the directory position can be located to the position of a subdirectory corresponding to a video next to the last video that has been played completely last time.

Assuming that there are 10 videos in the video collection, and the user viewed video 3 last time, when the detail page of the video collection is presented, the directory position can be located to the position of the subdirectory corresponding to the video 3 or the position of the subdirectory corresponding to the video 4 according to whether the user has completed playing the video 3 last time.

Figure 1G:
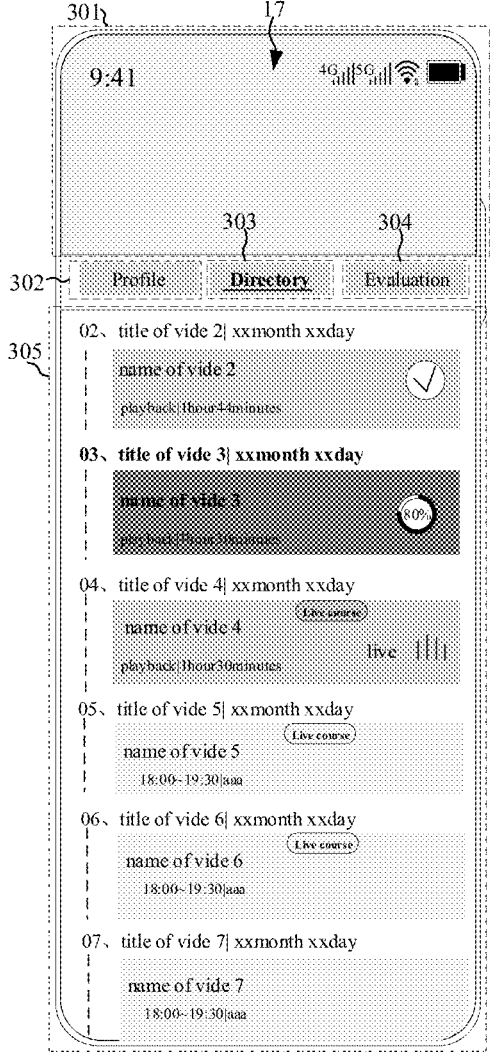

Assuming that there are 10 videos in the video collection, and it does not need to feedback a second video with respect to the video collection, video 3 that was played by the user last time has not been played completely, the directory position can be located to the position of the subdirectory corresponding to the video 3, and the user interface as shown in FIG. 1G may then be displayed, wherein the user interface 17 shown in FIG. 1G includes area 301, tag 302, tag 303, tag 304 and area 305, area 301, tag 302, tag 303, tag 304 and area 305 which are similar to area 101, tag 102, tag 103, tag 104 and area 105 shown in FIG. 1A, respectively, and the specific implementation may refer to the detailed description of area 105 in FIG. 1A.

The entire directory structure is presented in area 305, and the directory position is located to the position of a subdirectory corresponding to the video 3, the subdirectory corresponding to the video 3 can be highlighted in the area 305, therefore, the position of the subdirectory located currently can be explicit. In order to bring a better visual experience to the user, a previous video of the video can be located close to the positions of the tags 302, 303 and 304, and the subdirectories corresponding to the previous video (video 2) and the next video course (video 4) of the video 3 respectively can be displayed in the top area of the area 305.

Among them, the highlighting of the subdirectory corresponding to the video 3 may be implemented by color, brightness, filling color of a presentation area corresponding to the video 3, and the like. The present disclosure does not limit the specific implementation of the highlighting of the subdirectory.

With reference to the embodiment shown in FIG. 1G, since the video 3 has not been played completely last time, it is assumed that the playing progress is 80%, the state of the first tag corresponding to the video 3 is the fourth state, which can be implemented by combining patterns and numbers.

Figure 1H:
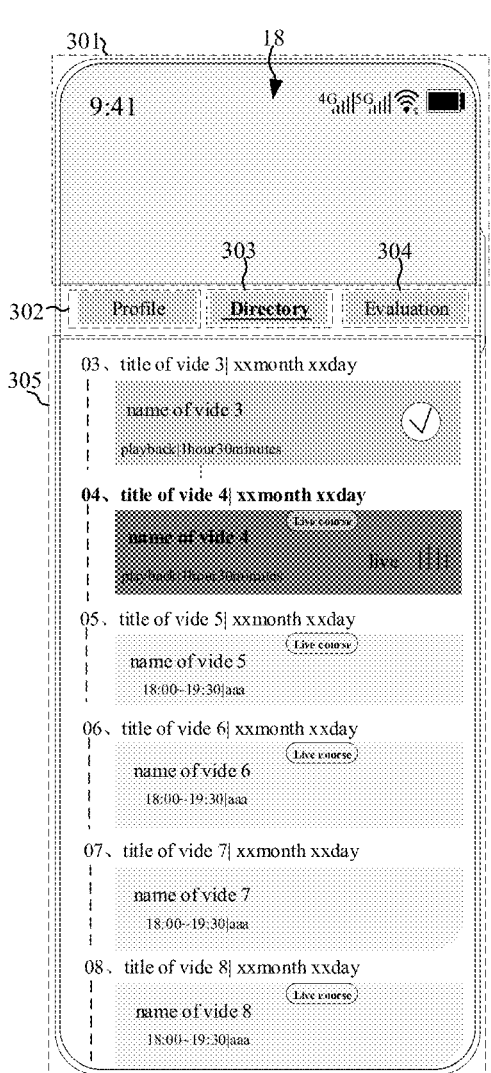

Assuming that the video 3 played by the user last time has been completely played, the directory position is located to the position of the first subdirectory corresponding to the video 4, then the user interface shown in FIG. 1H may be displayed, wherein the user interface 18 shown in FIG. 1H includes area 401, tag 402, tag 403, tag 404 and area 405, and area 401, tag 402, tag 403, tag 404 and area 405 are similar to area 101, tag 102, tag 103, tag 104 and area 105 shown in FIG. 1A, respectively, the specific implementation may refer to the detailed description of area 105 in FIG. 1A.

The entire directory structure can be presented in area 405, and the directory position is located to the position of a subdirectory corresponding to the video 4, the subdirectory corresponding to the video 4 can be highlighted in the area 405, therefore, the position of the subdirectory located currently can be explicit. In order to bring a better visual experience to the user, a previous video of the video can be located close to the positions of the tags 402, 403 and 404, and the subdirectories corresponding to the previous video (video 3) and the next video course (video 5) of the video 4 respectively can be displayed in the top area of the area 405.

Among them, the highlighting of the first subdirectory corresponding to the video 4 may be implemented by color, brightness, filling color of a presentation area corresponding to the video 4, and the like. The present disclosure does not limit the specific implementation of the highlighting of the first subdirectory.

With reference to the embodiment shown in FIG. 1H, since the video 4 has been played completely last time, the state of the first tag corresponding to the video 4 is the third state, which can be implemented by symbols.

In conjunction with the foregoing, since the fifth video has not started yet, if the video played by the user last time is video 4, and video 4 has been completely played last time, then when the video collection detail page is entered this time, the directory can be located to the subdirectory corresponding to the video 5, however, because video 5 has not started yet, the first tag corresponding to the video 5 may be in a sixth state, i.e. a hidden state, if the application 1 receives a trigger operation for the presentation area corresponding to the video 5, a preset prompt message may be presented, for example, the application 1 may display a prompt window, and a text prompt content "The course has not started yet, please wait patiently" can be displayed in the prompt window, of course, the text prompt content is not limited to the foregoing example. The prompt window may also be combined with other manners such as animation, sound and the like to prompt the user that the course start time of the video is not arrived at yet.

Based on the embodiments shown in FIG. 1A to FIG. 1H and in combination with the embodiment shown in FIG. 2, the specific implementation of the video collection presentation provided by the present disclosure will be described in detail.

Figures 2, 3:
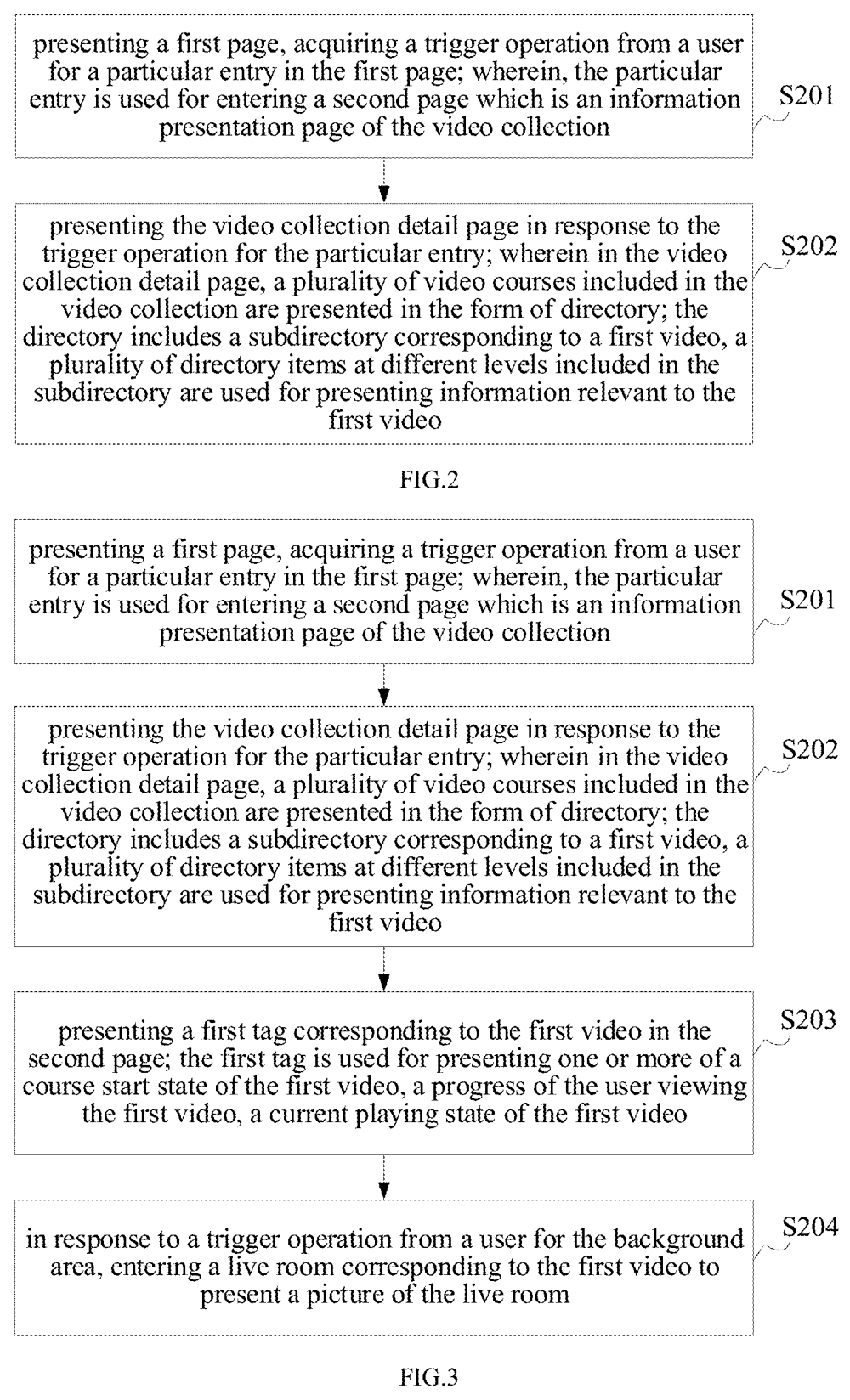

FIG. 2 is a schematic flowchart of a video collection presentation method according to an embodiment of the present disclosure, referring to FIG. 2, the method according to the embodiment of the present disclosure may include:

S201: presenting a first page, acquiring a trigger operation from a user for a particular entry in the first page: wherein, the particular entry is used for entering a second page which is an information presentation page of the video collection.

The video collection may include a plurality of first videos that explain the skills in terms of video clipping. The second page may also be referred to as a video collection detail page or other names.

As a possible embodiment, an application can be installed on the electronic device, the application can provide a particular entry for entering the video collection detail page at startup, a user can input an operation instruction aiming at the particular entry into the application through a trigger operation such as clicking or long pressing, and in turn, the application can receive the operation instruction aiming at the particular entry.

The present disclosure does not limit the page (i.e., the first page) where the particular entry is located, for example, the particular entry may be located at the first page of the application, or the particular entry may also be located at other pages of the application, which is not limited by the present disclosure.

In addition, the present disclosure does not limit the style of a particular entry, and may be implemented in any one or more forms such as text, icon, symbol, animation, and the like.

S202, presenting the video collection detail page in response to the trigger operation for the particular entry:

wherein in the video collection detail page, a plurality of video courses included in the video collection are presented in the form of directory; the directory includes a subdirectory corresponding to a first video, a plurality of directory items at different levels included in the subdirectory are used for presenting information relevant to the first video.

The subdirectory corresponding to the first video may be a multi-level directory structure, that is, the number of levels of the subdirectory is two or more than two, and correspondingly, the entire directory structure corresponding to the video collection has two or more than two levels.

It should also be noted that the numbers of levels of the subdirectories corresponding to the multiple first videos in the video collection may be the same or different, which is not limited in the present disclosure.

The subdirectory may include a plurality of directory items at different levels for presenting information relevant to the first video, wherein the information of the first video presented by the directory items at different levels is not limited in the disclosure.

For example, the subdirectory has a two-level directory structure, the first-level directory item may present the title of the first video, and the second-level directory item may present the name of the first video, 25xemplarily, reference can be made to the embodiment shown in FIG. 1B.

As another example, a higher level of directory item may also be provided as an upper directory item of the subdirectory, to present information relevant to the one or more associated first videos, the present disclosure does not limit a specific content of the upper directory item which, for example, may represent learning stage information, time node information, and the like of the one or more first videos. For example, reference may be made to the embodiment shown in FIG. 1C.

In an actual application, the user may enter the second page for the first time or not the first time.

If the user enters the second page for the first time, the directory can be located to the position of the subdirectory corresponding to the first video for presentation.

If the user does not enter the second page for the first time, then, the position of a subdirectory to be presented can be determined based on whether the last video played by the user last time has been completely played. Exemplarily, if the last video played by the user last time has been not completely played yet, the directory may be located to the position of the subdirectory corresponding to the video, which has been not completely played last time yet, for presentation. If the last video played by the user last time has been completely played, the directory may be located to the position of the subdirectory corresponding to a video next to the video for presentation. In a process of presentation, the located subdirectory may be highlighted for presentation, and a previous subdirectory and a subsequent subdirectory of the located subdirectory may also be highlighted. Exemplarily, reference may be made to the implementation of the embodiments shown in FIG. 1G and FIG. 1H.

Of course, the located directory position may also be presented in other styles, which is not limited in the present disclosure, for example, the located subdirectory may be presented close to the top of the area where the directory is presented, while the subdirectory corresponding to the previous video is not reserved, or when the located subdirectory is highlighted, only the text included in the subdirectory may be highlighted.

The method provided by the embodiment can present a plurality of first videos in the video collection that explain video clipping skills in the second page in the form of directory: when the video collection is presented in the directory form, a subdirectory corresponding to the first video can include a plurality of directory items at different levels, by using the above directory items at different levels to present information relevant to the first video, the user can acquire more information relevant to the first video through directory items at different levels, so that the interest of the user in viewing the first video can be improved. In addition, by adopting the directory items with upper and lower hierarchical relationships to present the information relevant to the first video, the structure of the second page becomes clearer, the hierarchy becomes richer, and better visual experience can be brought to the user.

FIG. 3 is a schematic flowchart of a video collection presentation method according to an embodiment of the present disclosure. With reference to FIG. 3, on basis of the embodiment of FIG. 2, the method according to the present embodiment further includes:

S203, presenting a first tag corresponding to the first video in the second page; the first tag is used for presenting one or more of a course start state of the first video, a progress of the user viewing the first video, a current playing state of the first video.

In the present disclosure, the number of states, to which the first tag specifically corresponds, is not limited. Exemplarily, with reference to the description of the foregoing embodiments, the first tag may correspond to six states, and the state of the first tag corresponding to the first video may be switched among the six states based on the course start time of the first video, the learning situation of the user, the trigger operation of the user, and the like.

In addition, in the present disclosure, specific implementations of the first tags in different states are not limited, and may be implemented in one or more manners such as text, symbol, icon, dynamic effect, number, and the like, for example, reference may be made to the embodiment shown in FIG. 1B.

In the embodiment, the first tag is configured for the first video in the video collection, the state of the first video is indicated according to the first tag in different states, and the first tag provides an entry for a user to operate the first video, so that the user can very conveniently view the details of the first video.

Optionally, on the basis of the embodiment shown in FIG. 3, after S203, the method may further include:

S204: in response to a trigger operation from a user for the background area, entering a live room corresponding to the first video to present a picture of the live room.

In combination with the foregoing, the first tag provides an entry for the user to manipulate the first video, when the application receives a trigger operation from the user for the first tag corresponding to the first video, the application can determine whether the first video selected by the user meets the playing condition, and play the picture of the first video in the background area of the video collection detail page when it is determined that the first video selected by the user meets the playing condition.

In some possible implementations, when it is determined that the first video selected by the user arrives at the course start time, the first video selected by the user may be played in the background area, regardless of whether the first video before the first video selected by the user has been played.

In other possible implementations, assuming that the user wants to play a certain first video, a condition that any first video before the certain first video has been played needs to be met, therefore, the application receives a trigger operation from the user with respect to the first tag corresponding to the selected first video, first, it is determined that the first video selected by a user has arrived at the course start time, and it is determined that any first video before the first video selected by the user has been completely played, the first video selected by the user can be played in the background area, otherwise, a prompt message can be presented, to prompt the user that the currently selected first video can be presented only after all previous first videos have been completely played.

In some cases, a trial video may be designated in the video collection, and when the first video selected by the user is the designated trial video, the picture of the designated trial video may be played in the background area of the video collection detail page.

If the user wants to stop playing the first video, it can be implemented by operating the background area, or can be implemented by operating the first tag corresponding to the first video that is being played currently.

This embodiment provides an entry for the user to operate to preview and/or play video through the first tag, which is very convenient for the user: and the background area of the second page can be fully utilized to play the picture of the video without needing page jump. Compared with the manner of playing the video by page jump, the manner provided by the disclosure is more convenient.

FIG. 4 is a schematic flowchart of a video collection presentation method according to an embodiment of the present disclosure, referring to FIG. 4, the method according to the embodiment of the present disclosure includes:

S401, presenting a first page, acquiring a trigger operation from a user for a particular entry in the first page: wherein, the particular entry is used for entering a second page which is an information presentation page of the video collection.

Step S401 in this embodiment is similar to step S201 in the embodiment shown in FIG. 2, and reference may be made to the detailed description of the embodiment shown in FIG. 2, which will not be repeated herein for simplicity.

S402, presenting the video collection detail page in response to the trigger operation from the user for the particular entry: wherein in the video collection detail page, a plurality of video courses included in the video collection are presented in the form of directory: the directory includes a subdirectory corresponding to a first video, a plurality of directory items at different levels included in the subdirectory are used for presenting information relevant to the first video and information relevant to the second video, and the second video is an interactive video for feeding back to the first video.

The implementation manner of presenting the relevant information directory item of the first video in the subdirectory in this step can refer to the detailed description of step S202 in the embodiment shown in FIG. 2, which will be not repeated herein for brevity.

The subdirectory may include a directory item for representing relevant information of the second video, where the directory item used for representing the information relevant to the second video can be realized by using a one-level or multi-level directory structure. If the entire directory includes a plurality of second videos, the structure of the directory item corresponding to each of the second videos can be the same or different.

In conjunction with the foregoing, it will be apparent that in an actual application, the second video may be associated with one or more first videos in the video collection, the position of the directory item corresponding to the second video in the entire directory structure may be associated with the position of the subdirectory corresponding to the associated first video in the entire directory structure. Exemplarily, the position of the second subdirectory in the entire directory structure can refer to the embodiment shown in FIG. 1E, and the directory item corresponding to the second video is one of the directory items in the subdirectory corresponding to the associated first video.

The second video may not be configured with an association relationship with the first video, and the position of the directory item corresponding to the second video in the entire directory structure is determined at the task release time corresponding to the second video. Exemplarily, the position of the directory item corresponding to the second video in the entire directory structure may refer to the embodiment shown in FIG. 1F.

According to the method provided by the embodiment, by presenting the information relevant to the first video and the second video in the directory, the user can clearly know the current learning situation of the first video and the relevant completion situation of the second video.

On the basis of the embodiment shown in FIG. 4, a second tag corresponding to each of the second videos may also be presented on the video collection detail page.

In this scheme, the second tag may represent completion progress of the current second video, and the second tag may also serve as an entry to the third page at the same time, where the third page can be an information presentation page of the second video, that is, corresponding to the detail page of the second video as previously mentioned. The present disclosure does not limit the specific implementation of the second tag, the second tag may be implemented in one or more ways such as text, icon, symbol, dynamic effect, etc. The completion progress may include, for example, to be upload, under review, completed, etc. For example, reference can be made to the implementation of the second tag in the embodiment shown in FIG. 1E.

On this basis, the application 1 receives a trigger operation from the user for the second tag, and may enter a third page. In the third page, information relevant to all or part of the second videos related to the video collection can be presented in a list form, the relevant information includes, for example, completion progress information, comprehensive scoring information, and the like.

The present disclosure does not limit the specific implementation of the second page, which may be presented in the form of a list, or may be presented in other forms.

It should be noted that the embodiment shown in FIG. 3 and the embodiment shown in FIG. 4 may also be combined, that is, the first tag corresponding to the first video may be presented in the second page to indicate the state of the first video.

Exemplarily, the disclosure also provides a video collection presentation apparatus.

FIG. 5 is a schematic structural diagram of a video collection presentation apparatus according to an embodiment of the present disclosure. Referring to FIG. 5, the video collection presentation apparatus 500 according to the embodiment of the present disclosure includes:

a presentation module 502 configured to present a first page;

an acquisition module 501 configured to acquire a trigger operation from a user for a particular entry in the first page: wherein, the particular entry is used for entering a second page which is an information presentation page of the video collection, wherein the video collection includes a plurality of first videos that explain video clipping skills;

the presentation module 502 can be configured to present the second page in response to the trigger operation for the particular entry: wherein in the second page, a plurality of first videos included in the video collection are presented in the form of directory: the directory includes a subdirectory corresponding to the first video, the subdirectory corresponding to the first video includes a plurality of directory items at different levels, the directory items at different levels are used for presenting information relevant to the first video and information relevant to a second video, and the second video is an interactive video for feeding back to the first video.

As a possible implementation, the presentation module 502 can be further configured to present a first tag corresponding to the first video in the second page: the first tag can be used to indicate one or more of a course start state of the first video, a progress of the user viewing the first video, a current playing state of the first video.

As a possible implementation, the acquisition module 501 can be further configured to receive a trigger operation from the user for the first tag corresponding to a target first video in the second page.

The presentation module 502 can be further configured to present a target first video in a background area of the second page in response to the trigger operation from the user for the first tag corresponding to the target first video in the second page; the plurality of first videos in the course collection includes the target first video.

As a possible implementation, if the target video course is a live video and is currently live: the acquisition module 501 can be further configured to receive a trigger operation for the background area.

The display module 502 can be further configured to enter a live room corresponding to the target first video in response to the trigger operation from a user for the background area, to present a picture of the live room.

As a possible implementation, the display module 502 is specifically configured to locate the directory to a position of a specified subdirectory when presenting the second page in response to the trigger operation for the particular entry, and the specified subdirectory can be determined according to the last first video viewed by the user last time.

As a possible implementation, the presentation module 502 can be further configured to present a second tag corresponding to the second video in the second page: the second tag is used to enter a third page, which is an information presentation page of the second video.

As a possible implementation, the acquisition module 501 can be further configured to acquire a trigger operation for the user for a second tag corresponding to the second video.

The display module 502 can be further configured to enter the third page in response to the trigger operation for the second tag corresponding to the second video, the third page includes an entry for a user to publish the second video.

The video collection presentation apparatus provided by this embodiment may be used to execute the technical solution of any of the foregoing method embodiments, and their implementation principles and technical effects are similar, and reference may be made to the detailed descriptions of the foregoing method embodiments, which will not be repeated herein for the sake of brevity.

It should be noted that each of the above modules and/or units only belongs to a logical module classified according to the specific function it implements, instead of limiting its specific implementation manner, for example, it can be implemented in software, hardware, or a combination of software and hardware. In an actual implementation, each of the above modules and/or units may be implemented as separate physical entity, or may be implemented by a single entity (for example, a processor (CPU or DSP, etc.), an integrated circuit, etc.). In addition, if the above-described modules and/or units are shown in the drawings by dashed lines, it may be indicated that these modules and/or units may not actually exist, and the operations/functions implemented by them may be implemented by the apparatus itself or a processor in the apparatus, etc.

FIG. 6 is a schematic structural diagram of an electronic device according to an embodiment of the present disclosure. Referring to FIG. 6, an electronic device 600 according to an embodiment of the present disclosure includes a memory 601 and a processor 602.

The memory 601 may be a separate physical unit, and may be connected with the processor 602 through a bus 603, and the memory 601 and the processor 602 may also be integrated together and implemented by hardware.

The memory 601 can be configured to store program instructions, and the processor 602 can call the program instructions to perform operations of any of the above method embodiments.

Optionally, when part or all of the methods of the above embodiments are implemented by software, the above electronic device 600 may also include only the processor 602. The memory 601 configured to store a program can be located outside the electronic device 600, and the processor 602 can be connected to the memory by a circuit/wire, and configured to read and execute the program stored in the memory.

The processor 602 may be a central processing unit (CPU), a network processor (NP), or a combination of CPU and NP.

The processor 602 may further include a hardware chip. The above hardware chip may be an application-specific integrated circuit (ASIC), a programmable logic device (PLD), or a combination thereof. The PLD may be a complex programmable logic device (CPLD), a field-programmable gate array (FPGA), a general array logic (GAL), or any combination thereof.

The memory 601 may include a volatile memory, e.g., a random-access memory (RAM): the memory may also include a non-volatile memory, e.g., a flash memory, a hard disk drive (HDD), or a solid-state drive (SSD): the memory may also include a combination of the above-described types of memories.

An embodiment of the present disclosure further provides a readable storage medium, including: computer program instructions: the computer program instructions, when executed by at least one processor of an electronic device, implement the video collection presentation method according to any of the above method embodiments.

An embodiment of the present disclosure further provides a computer program product, the program product comprises a computer program, the computer program is stored in a readable storage medium, at least one processor of an electronic device can read the computer program from the readable storage medium, and the at least one processor executes the computer program to enable the electronic device to implement the video collection presentation method according to any of the above method embodiments.

The embodiment of the present disclosure also provides a computer program, and the computer program includes program codes that, when executed by a computer, causes the computer to implement the video collection presentation method according to any of the above method embodiments.

It should be noted that, relational terms such as 'first' and 'second' are only used to distinguish one entity or operation from another entity or operation, without requiring or implying such actual relationship or order between such entities or operations. The terms "comprise", "include" or any other variation thereof are intended to encompass a non-exclusive inclusion, so that a process, method, article or apparatus comprising a series of elements includes not only those elements, but also other elements not explicitly listed, or elements inherent to such a process, method, article, or apparatus. Without further limitation, the element as defined by the phrase "comprising a" does not preclude presence of additional identical elements in a process, method, article, or apparatus that includes said element.

What has been described above is only a specific implementation of the present disclosure so as to enable those skilled in the art to understand or implement the disclosure. Various modifications to the embodiments will be readily apparent to those skilled in the art, and the generic principles defined herein may be implemented in other embodiments without departing from the spirit or scope of the disclosure. Therefore, the present disclosure is not to be limited to the embodiments set forth herein, but is to be accorded the widest scope consistent with the principles and novel features disclosed herein.

What is claimed is:

1. A video collection presentation method, comprising:

presenting a first page, acquiring a trigger operation from a user for a particular entry in the first page; wherein, the particular entry is used for entering a second page which is an information presentation page of the video collection;

presenting the second page in response to the trigger operation for the particular entry; wherein in the second page, a plurality of first videos comprised in the video collection are presented in the form of a directory; the directory includes a subdirectory corresponding to each of the plurality of first videos, the subdirectory corresponding to each first video includes a plurality of directory items at different levels, the directory items at different levels are used for presenting information relevant to the first video, and the directory further includes a directory item that is used for presenting information relevant to a second video, and the second video is an interactive video which is fed back for one or more interactive tasks configured for the video collection, wherein when the second video is associated with a specific first video, the directory item corresponding to the second video is a directory item in a subdirectory corresponding to the associated specific first video.

2. The method of claim 1, further comprising:

presenting a first tag corresponding to each of the plurality of first videos in the second page; wherein the first tag is used for indicating one or more of a course start state of the first video, a progress of the user viewing the first video, a current playing state of the first video.

3. The method of claim 2, further comprising:

presenting a target first video in a background area of the second page in response to the trigger operation from the user for the first tag corresponding to the target first video in the second page; wherein the plurality of first videos in the video collection comprise the target first video.

4. The method of claim 3, wherein the target first video is a live video and is currently live, and the method further comprises:

entering a live room corresponding to the target first video in response to a trigger operation from a user for the background area, to present a picture of the live room.

5. The method of claim 1, wherein the presenting the second page in response to the trigger operation for the particular entry, comprises:

locating the directory to a position of a specified subdirectory when presenting the second page in response to the trigger operation for the particular entry, and wherein the specified subdirectory is determined according to a last first video viewed by the user previously.

6. The method of claim 1, further comprising:

presenting a second tag corresponding to each second video in the second page; wherein the second tag is used to enter a third page, which is an information presentation page of the second video.

7. The method of claim 6, further comprising:

entering the third page in response to the trigger operation for the second tag corresponding to the second video, wherein the third page comprises an entry for a user to publish the second video.

8. The method of claim 1, wherein the plurality of first videos comprised in the video collection are a plurality of first videos explaining video clipping skills.

9. An electronic device comprises: a memory and a processor;

the memory is configured to store computer program instructions;

the processor is configured to execute the computer program instructions to cause the electronic device to implement:

presenting a first page, acquiring a trigger operation from a user for a particular entry in the first page; wherein, the particular entry is used for entering a second page which is an information presentation page of the video collection;

presenting the second page in response to the trigger operation for the particular entry; wherein in the second page, a plurality of first videos comprised in the video collection are presented in the form of a directory; the directory includes a subdirectory corresponding to each of the plurality of first videos, the subdirectory corresponding to each first video includes a plurality of directory items at different levels, the directory items at different levels are used for presenting information relevant to the first video, and the directory further includes a directory item that is used for presenting information relevant to a second video, and the second video is an interactive video which is fed back for one or more interactive tasks configured for the video collection, wherein when the second video is associated with a specific first video, the directory item corresponding to the second video is a directory item in a subdirectory corresponding to the associated specific first video.

10. The electronic device of claim 9, wherein the processor is further configured to execute the computer program instructions to cause the electronic device to implement:

presenting a first tag corresponding to each of the plurality of first videos in the second page; wherein the first tag is used for indicating one or more of a course start state of the first video, a progress of the user viewing the first video, a current playing state of the first video.

11. The electronic device of claim 10, wherein the processor is further configured to execute the computer program instructions to cause the electronic device to implement:

presenting a target first video in a background area of the second page in response to the trigger operation from the user for the first tag corresponding to the target first video in the second page; wherein the plurality of first videos in the video collection comprise the target first video.

12. The electronic device of claim 11, wherein the target first video is a live video and is currently live, and wherein the processor is further configured to execute the computer program instructions to cause the electronic device to implement:

entering a live room corresponding to the target first video in response to a trigger operation from a user for the background area, to present a picture of the live room.

13. The electronic device of claim 9, wherein the presenting the second page in response to the trigger operation for the particular entry, comprises:

locating the directory to a position of a specified subdirectory when presenting the second page in response to the trigger operation for the particular entry, and wherein the specified subdirectory is determined according to a last first video viewed by the user previously.

14. The electronic device of claim 9, wherein the processor is further configured to execute the computer program instructions to cause the electronic device to implement:

presenting a second tag corresponding to each second video in the second page; wherein the second tag is used to enter a third page, which is an information presentation page of the second video.

15. A non-transitory readable storage medium comprising: computer program instructions;

the computer program instructions, when executed by at least one processor of an electronic device, cause the electronic device to implement:

presenting a first page, acquiring a trigger operation from a user for a particular entry in the first page; wherein, the particular entry is used for entering a second page which is an information presentation page of the video collection;

presenting the second page in response to the trigger operation for the particular entry; wherein in the second page, a plurality of first videos comprised in the video collection are presented in the form of a directory; the directory includes a subdirectory corresponding to each of the plurality of first videos, the subdirectory corresponding to each first video includes a plurality of directory items at different levels, the directory items at different levels are used for presenting information relevant to the first video, and the directory further includes a directory item that is used for presenting information relevant to a second video, and the second video is an interactive video which is fed back for one or more interactive tasks configured for the video collection, wherein when the second video is associated with a specific first video, the directory item corresponding to the second video is a directory item in a subdirectory corresponding to the associated specific first video.

16. The non-transitory readable storage medium of claim 15, wherein the computer program instructions, when executed by at least one processor of an electronic device, cause the electronic device to further implement:

presenting a first tag corresponding to each of the plurality of first videos in the second page; wherein the first tag is used for indicating one or more of a course start state of the first video, a progress of the user viewing the first video, a current playing state of the first video.

17. The non-transitory readable storage medium of claim 16, wherein the computer program instructions, when executed by at least one processor of an electronic device, cause the electronic device to further implement:

presenting a target first video in a background area of the second page in response to the trigger operation from the user for the first tag corresponding to the target first video in the second page; wherein the plurality of first videos in the video collection comprise the target first video.

18. The non-transitory readable storage medium of claim 17, wherein the target first video is a live video and is currently live, and wherein the computer program instructions, when executed by at least one processor of an electronic device, cause the electronic device to further implement:

entering a live room corresponding to the target first video in response to a trigger operation from a user for the background area, to present a picture of the live room.

19. The non-transitory readable storage medium of claim 15, wherein the presenting the second page in response to the trigger operation for the particular entry, comprises:

locating the directory to a position of a specified subdirectory when presenting the second page in response to the trigger operation for the particular entry, and wherein the specified subdirectory is determined according to a last first video viewed by the user previously.

20. The non-transitory readable storage medium of claim 15, wherein the computer program instructions, when executed by at least one processor of an electronic device, cause the electronic device to further implement:

presenting a second tag corresponding to each second video in the second page; wherein the second tag is used to enter a third page, which is an information presentation page of the second video.

* * * * *